United States Patent
Lescoup (10) Patent No.: US 11,692,511 B2
(45) Date of Patent: Jul. 4, 2023

(54) AIRCRAFT TURBOJET ENGINE COMPRISING TWO THRUST REVERSER MODULES

(71) Applicant: Airbus Operations SAS, Toulouse (FR)

(72) Inventor: Jérôme Lescoup, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 0 days.

(21) Appl. No.: 17/575,686

(22) Filed: Jan. 14, 2022

(65) Prior Publication Data
US 2022/0228540 A1    Jul. 21, 2022

(30) Foreign Application Priority Data
Jan. 19, 2021 (FR) ........................... 2100470

(51) Int. Cl.
*F02K 1/80* (2006.01)
*F02K 1/72* (2006.01)
*F02C 7/28* (2006.01)
*F01D 11/00* (2006.01)
*B64D 29/08* (2006.01)

(52) U.S. Cl.
CPC .............. *F02K 1/805* (2013.01); *B64D 29/08* (2013.01); *F01D 11/005* (2013.01); *F02C 7/28* (2013.01); *F02K 1/72* (2013.01); *F05D 2220/323* (2013.01); *F05D 2240/55* (2013.01)

(58) Field of Classification Search
CPC ... F02K 1/805; F02K 1/72; F02C 7/28; F01D 11/005
See application file for complete search history.

(56) References Cited

U.S. PATENT DOCUMENTS

| 2017/0284216 A1* | 10/2017 | Khidekel | F02K 1/805 |
| 2018/0156131 A1 | 6/2018 | Olson | |
| 2020/0095879 A1* | 3/2020 | De Pau, Jr. | F01D 11/005 |

FOREIGN PATENT DOCUMENTS

EP    3628597 A1    4/2020

OTHER PUBLICATIONS

French Search Report; priority document.

* cited by examiner

*Primary Examiner* — Andrew H Nguyen
(74) *Attorney, Agent, or Firm* — Greer, Burns & Crain, Ltd.

(57) ABSTRACT

A turbojet engine with two thrust reverser modules. Each module includes an outer casing, an inner casing and a securing system for securing the inner casing to the outer casing which comprises first and second hoods. A housing between the hoods has a securing wall, a seal with a sausage secured to the securing wall, and a crusher rigidly secured to the second hood and arranged so as to crush the sausage towards the securing wall when the second hood goes from the spaced-apart position to the close-together position. Therefore, the sausage moves in the longitudinal direction, thus limiting shearing of the seal and transverse movements owing to the manufacturing and assembly tolerances and the movements in flight.

9 Claims, 5 Drawing Sheets

AIRCRAFT TURBOJET ENGINE COMPRISING TWO THRUST REVERSER MODULES

CROSS-REFERENCES TO RELATED APPLICATIONS

This application claims the benefit of the French patent application No. 2100470 filed on Jan. 19, 2021, the entire disclosures of which are incorporated herein by way of reference.

FIELD OF THE INVENTION

The present invention relates to an aircraft turbojet engine comprising two thrust reverser modules and a system for securing between two casings of each module, and to an aircraft comprising such a turbojet engine.

BACKGROUND OF THE INVENTION

Figure 1:
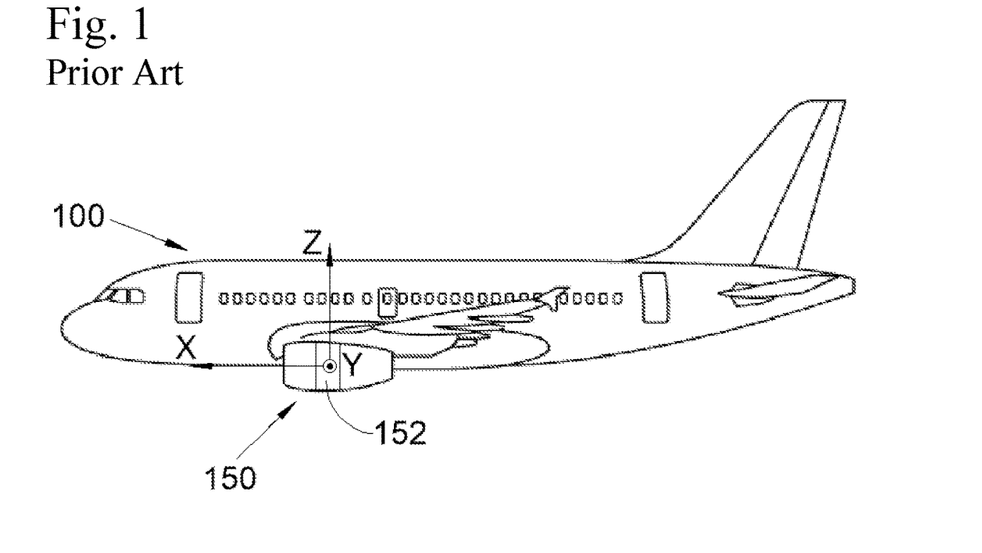
FIG. 1 is a side view of an aircraft.

FIG. 1 shows an aircraft 100 which conventionally comprises a turbojet engine 150 for generating a thrust to move the aircraft 100 forward. When the aircraft 100 has to brake, it is known practice to use thrust reverser modules 152 which form part of the turbojet engine 150 and which generate a thrust in the opposite direction to the direction of forward travel of the aircraft 100 so as to slow the aircraft down. There is a thrust reverser module 152 to port and to starboard.

Figure 2:
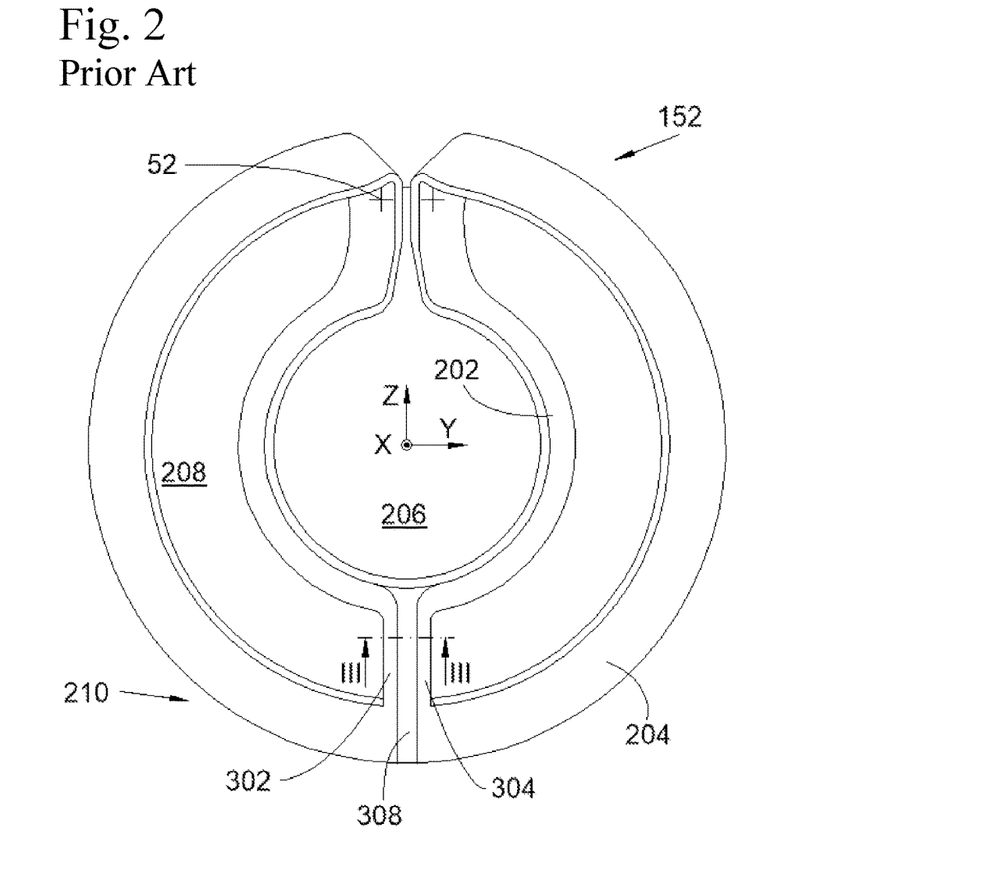
FIG. 2 is a schematic end-on view of the reverser modules of a turbojet engine.

FIG. 2 is a schematic end-on view of the thrust reverser modules 152.

The turbojet engine 150 and the reverser modules 152 comprise a secondary duct 208 in which a secondary air stream flows from the front to the rear of the aircraft 100.

Each reverser module 152 comprises reverser doors which are movably mounted on the structure of the reverser module 152 and which take up either a retracted position or a deployed position. In the retracted position, the reverser doors do not lie across the secondary duct 208 and do not obstruct the flow of the secondary stream. In the deployed position, the reverser doors lie across the secondary duct 208 and obstruct the flow of the secondary stream. The secondary stream is then directed outwards, towards the front of the turbojet engine 150, so as to generate a thrust that slows down the aircraft 100.

Each reverser module 152 comprises an inner casing 202 and an outer casing 204. The casings 202 and 204 each generally have the form of a half-cylinder centered on a longitudinal direction X of the reverser module 152 corresponding to a longitudinal direction of the turbojet engine 150.

For maintenance reasons, the two reverser modules 152 are pivotably mounted on a structure of the turbojet engine 150 and each reverser module 152 is rotatably movable about a horizontal axis 52 positioned at the top of the turbojet engine 150.

The inner casings 202 delimit an internal volume 206 which houses the core of the turbojet engine 150. The secondary duct 208 is delimited between each inner casing 202 and the corresponding outer casing 204.

So as to secure the two casings 202 and 204 to one another concentrically, it is known practice to fit securing systems 210 which extend radially relative to the longitudinal direction X. In particular, it is known practice to use a securing system 210 which is positioned at 6 o'clock in an area referred to as the "lower fork" and which generally has the shape of a beam extending in a vertical plane XZ.

Figure 3:
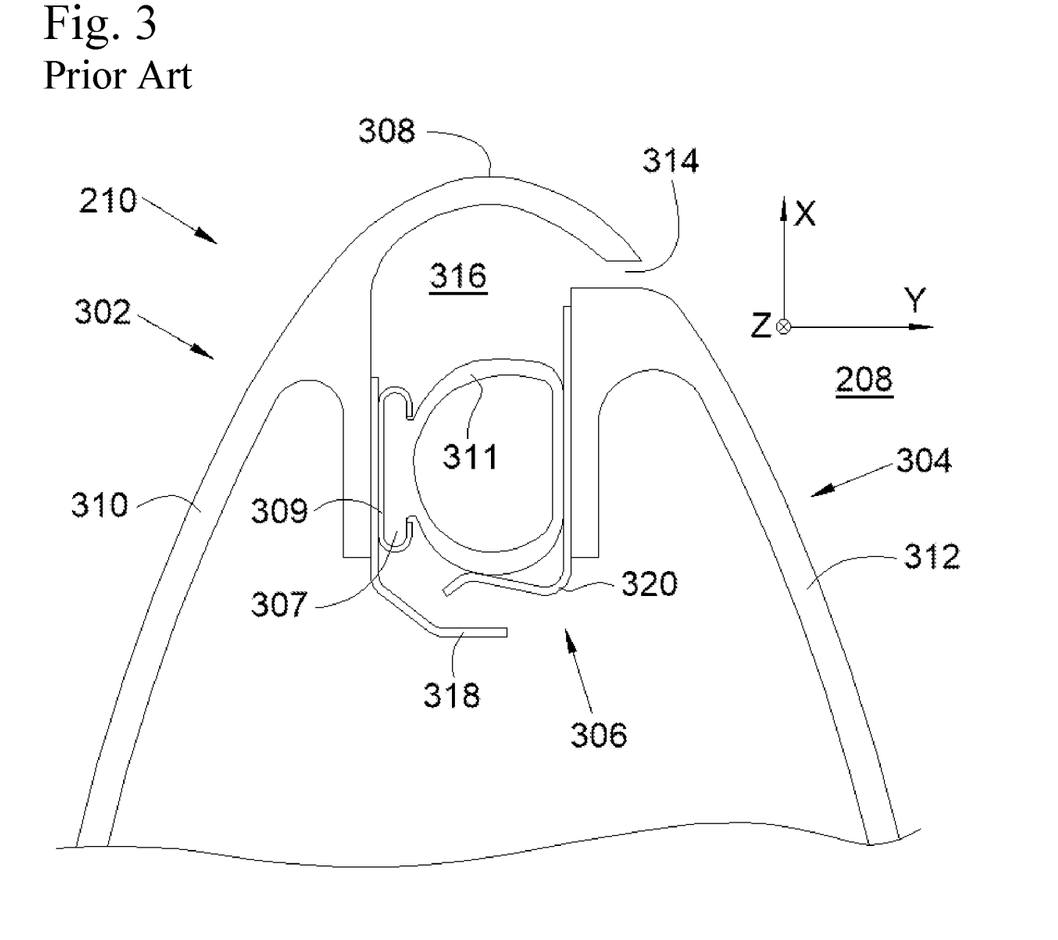
FIG. 3 is a view in section along the line III-III of FIG. 2, of a prior art securing system.

FIG. 3 shows a prior art securing system 210 in section along the line III-III of FIG. 2 and in the secondary duct 208.

During maintenance of the turbojet engine 150, the two reverser modules 152 are moved apart by a technician and the securing system 210 is opened to check the components that are housed in the securing system 210. To this end, the securing system 210 comprises a port-side hood 302 secured between the inner casing 202 and the outer casing 204 of the reverser module 152 to port, and a starboard-side hood 304 secured between the inner casing 202 and the outer casing 204 of the reverser module 152 to starboard.

In the operating position (FIG. 3), the starboard-side hood 304 and the port-side hood 302 are held against one another.

The port-side hood 302 in this case has a leading edge 308 which faces the secondary stream and which is extended on one of its sides by a port-side flank 310 extending towards the rear of the turbojet engine 150. The leading edge 308 extends in this case generally parallel to the vertical direction Z.

The starboard-side hood 304 in this case comprises only a starboard-side flank 312.

When the port-side hood 302 and the starboard-side hood 304 are in the operating position, the starboard-side flank 312 extends the leading edge 308 on the other of its sides, and there is a channel 314 between the port-side hood 302 and the starboard-side flank 312.

To join the two hoods 302 and 304, there is a seal 306, such as an elastomer seal, secured to one of the hoods, in this case the port-side hood 302, against which seal the other hood, in this case the starboard-side hood 304, bears.

The seal 306 is in a housing 316 formed inside the securing system 210, generally between the port-side flank 310 and the starboard-side flank 312. The housing 316 is in fluid communication with the channel 314.

The seal 306 comprises a foot 307 and a sausage 311 rigidly secured to the foot 307 and the securing system 210 comprises a shoe 309 which is secured to the port-side hood 302 in a vertical plane XZ and in which the foot 307 is held. The foot 307 is thus secured in a vertical plane XZ and the sausage 311 protrudes from the foot 307 in a transverse direction Y which is perpendicular to the vertical plane XZ.

The seal 306 creates a fluid tight and fireproof seal between the interior of the securing system 210 and the secondary duct 208. For enhanced sealing, it is known practice to create labyrinths with the aid of metal strips.

The securing system 210 in this case comprises a first strip 318 secured to the interior of the port-side hood 302 and a second strip 320 secured to the interior of the starboard-side hood 304. The two strips 318 and 320 are curved towards one another downstream of the seal 306 relative to the channel 314.

Owing to manufacturing tolerances and assembly tolerances for assembly of the reverser modules 152 on the structure of the turbojet engine 150, and as a result of the relative movements in flight between the port-side hood 302 and the starboard-side hood 304, the forces are applied mainly parallel to the transverse direction Y. The seal therefore moves mainly in the transverse direction Y and it is necessary to provide a robust seal, i.e., one with a large diameter so as to ensure sealing and longevity.

With a seal this robust, considerable force is needed to close the hoods and it is thus desirable to find a new arrangement for the securing system.

SUMMARY OF THE INVENTION

One aim of the present invention is to propose an aircraft turbojet engine comprising two thrust reverser modules and comprising a system for securing between an inner casing and an outer casing of each thrust reverser module, wherein the securing system comprises a port-side hood and a starboard-side hood between which is positioned a seal which undergoes less deformation and wherein less force is required to secure the hoods.

To this end, it proposes a turbojet engine of an aircraft having a longitudinal direction and a transverse direction perpendicular to the longitudinal direction and comprising:
a structure,
two thrust reverser modules pivotably mounted on the structure between a close-together position and a spaced-apart position,
wherein each thrust reverser module comprises an outer casing generally in the form of a half-cylinder centered on the longitudinal direction, an inner casing generally in the form of a half-cylinder centered on the longitudinal direction, housed inside the outer casing, and
a securing system for securing, for each thrust reverser module, the inner casing to the outer casing, and comprising:
a first hood secured between the inner casing and the outer casing of one of the reverser modules, and having a leading edge,
a second hood secured between the inner casing and the outer casing of the other of the reverser modules,
wherein a housing is formed between the first hood and the second hood and delimited by a securing wall of the first hood extending perpendicularly to the longitudinal direction at the rear of the leading edge,
a seal comprising a foot and a sausage rigidly secured to the foot, wherein the foot is secured in the housing to the securing wall and wherein the sausage protrudes from the foot in the longitudinal direction, and
a crushing means rigidly secured to the second hood and arranged to crush the sausage towards the securing wall when the second hood goes from the spaced-apart position to the close-together position.

With such an arrangement, the sausage is subjected to forces mainly in the longitudinal direction. As a result, the sausage moves mainly in the longitudinal direction, thus limiting the movements in the transverse direction Y owing to the manufacturing and assembly tolerances and the movements in flight, thereby also limiting shearing at its foot. This has the advantage of making it possible to reduce the diameter of the seal and hence the force to be applied when closing the hoods.

According to one particular embodiment, the securing system further comprises a first elastic strip with a first end secured in the housing to the first hood, a second free end protruding towards the second hood, and, between the first end and the second end, a flat area generally parallel to the securing wall, wherein the sausage bears against the flat area, and the crushing means is a pushing means rigidly secured to the second hood and arranged so as to move the flat area towards the securing wall when the second hood goes from the spaced-apart position to the close-together position.

According to one particular embodiment, the pushing means is a second strip with a first end secured in the housing to the second hood, a second free end protruding towards the first hood and, between the first end and the second end, a flat area generally parallel to the securing wall, wherein in the spaced-apart position, the first strip is in a rest position, wherein the flat area of the second strip is level with or in front of the flat area of the first strip, wherein in the close-together position, the first strip is in an active position in which it is closer to the securing wall than in the rest position, and the flat area of the second strip is positioned behind and against the flat area of the first strip relative to the sausage.

Advantageously, the second end of the first strip is curved towards the securing wall and the second end of the second strip is curved away from the securing wall.

According to another particular embodiment, the pushing means is a second strip with a first end secured in the housing to the second hood, a second free end protruding towards the first hood and towards the rear of the reverser module, and, between the first end and the second end, a flat area which has an acute angle relative to the securing wall, wherein in the spaced-apart position, the first strip is in a rest position, wherein in the close-together position, the first strip is in an active position in which it is closer to the securing wall than in the rest position, and wherein the flat area of the second strip is positioned so as to come into contact with the second end of the first strip when going from the spaced-apart position to the close-together position.

Advantageously, the second end of the first strip is curved towards the securing wall.

According to one particular embodiment, the crushing means is a strip a first end of which is secured in the housing inside the second wall of the second hood and a second end of which is free and protrudes towards the first wall of the first hood, the second end is curved away from the securing wall, and in the spaced-apart position, the second end is positioned facing the sausage.

Advantageously, a plane of symmetry of the sausage is offset towards the first hood relative to a plane of symmetry of the foot.

The invention also proposes an aircraft comprising a turbojet engine according to one of the above variants.

BRIEF DESCRIPTION OF THE DRAWINGS

The abovementioned features of the invention, along with others, will become clearer on reading the following description of an embodiment, the description being provided with reference to the attached drawings, in which.

DETAILED DESCRIPTION OF THE PREFERRED EMBODIMENTS

Figure 4:
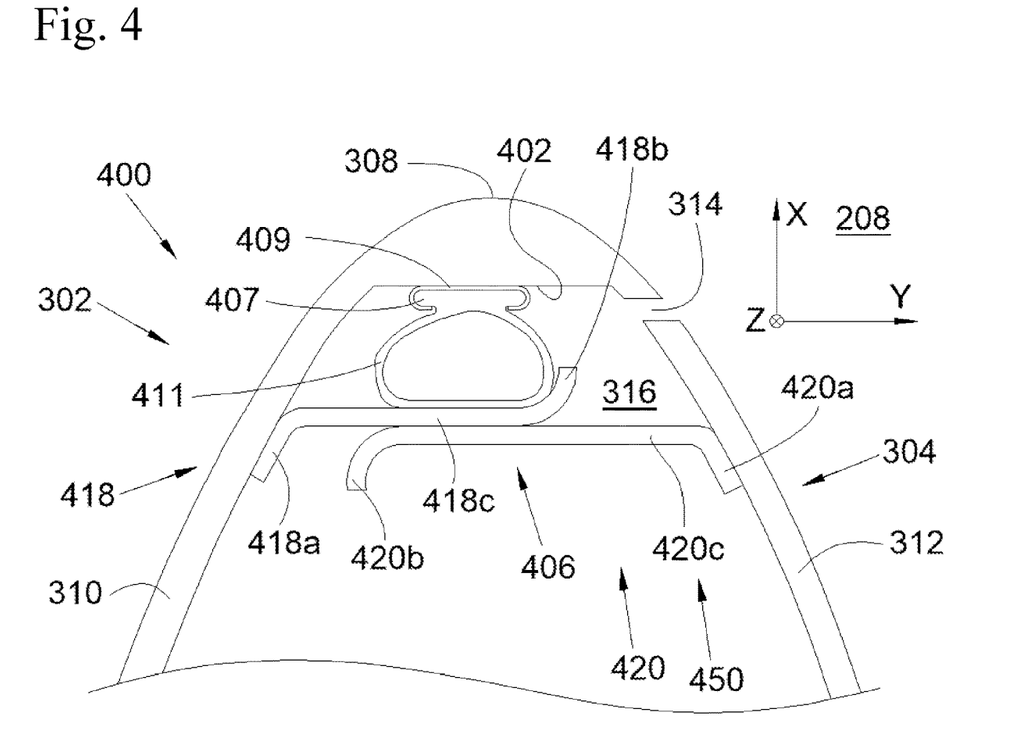
FIG. 4 shows a view similar to the view of FIG. 3 for a securing system according to a first embodiment of the invention.
Figure 5:
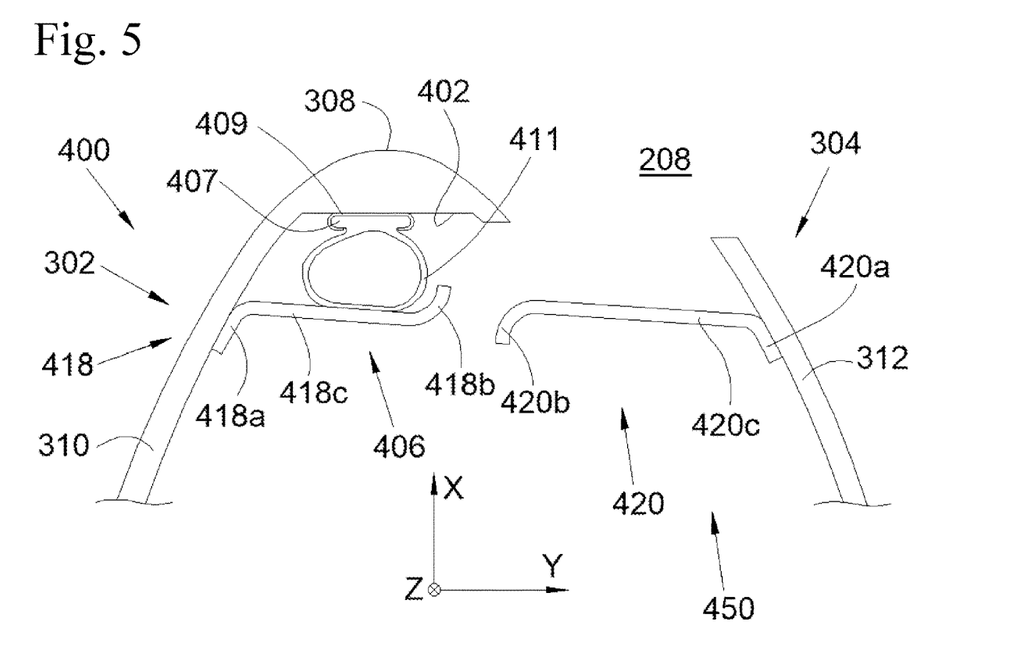
FIG. 5 shows the securing system of FIG. 4 in the open position.
Figure 6:
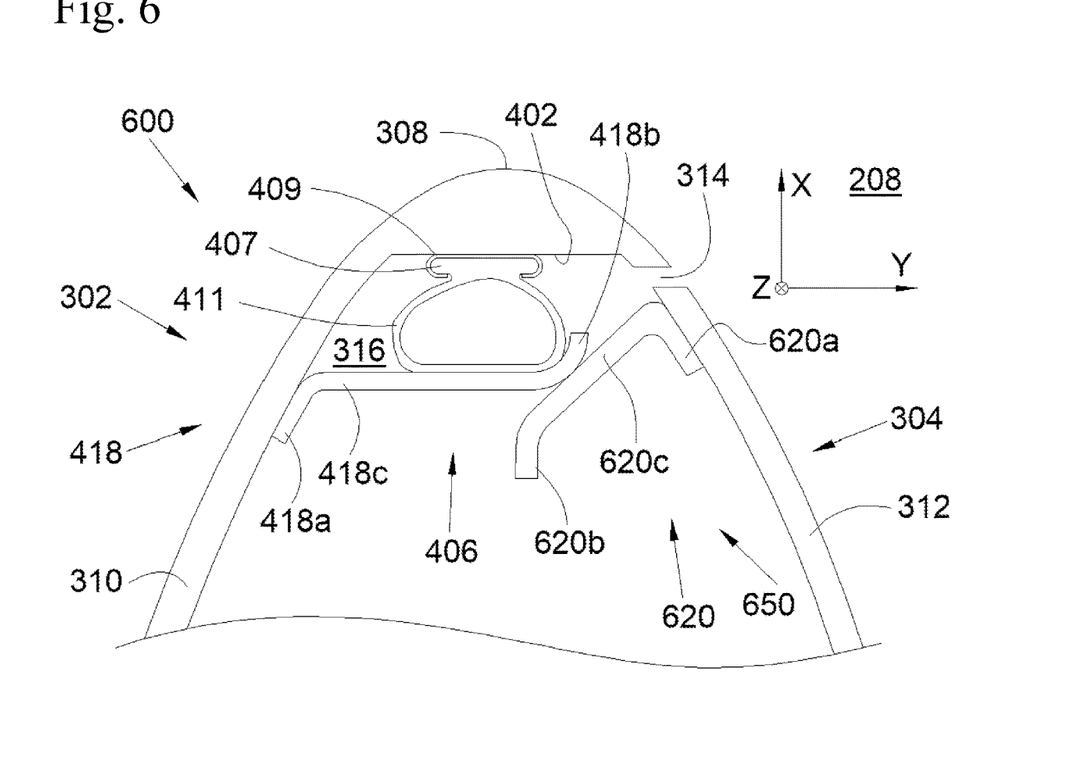
FIG. 6 shows a view similar to the view of FIG. 3 for a securing system according to a second embodiment of the invention.
Figure 7:
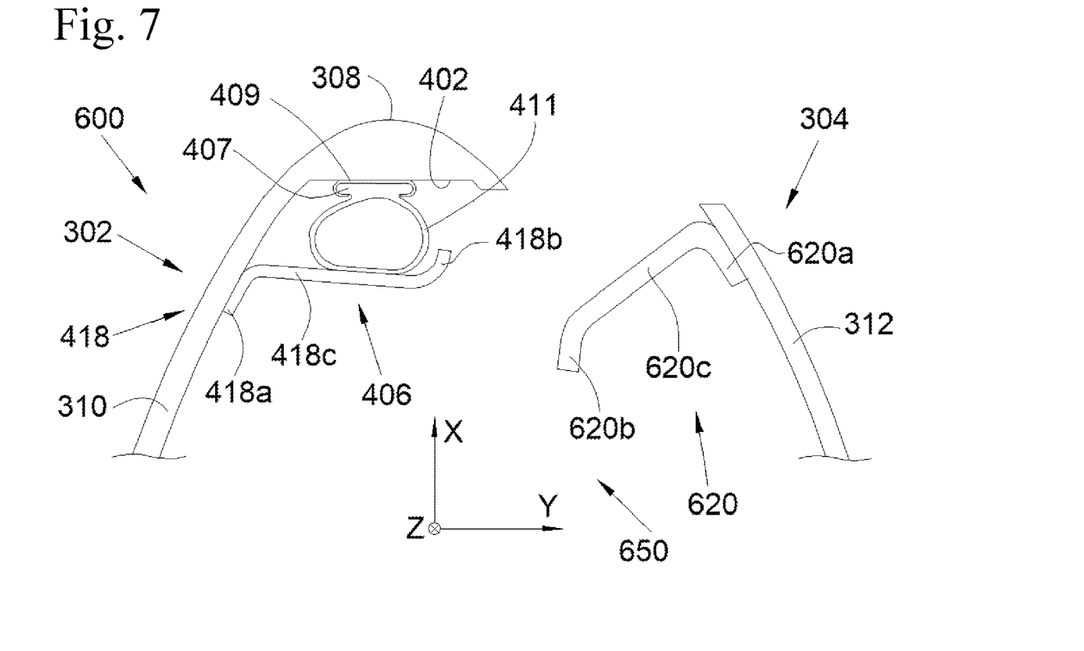
FIG. 7 shows the securing system of FIG. 6 in the open position.
Figure 8:
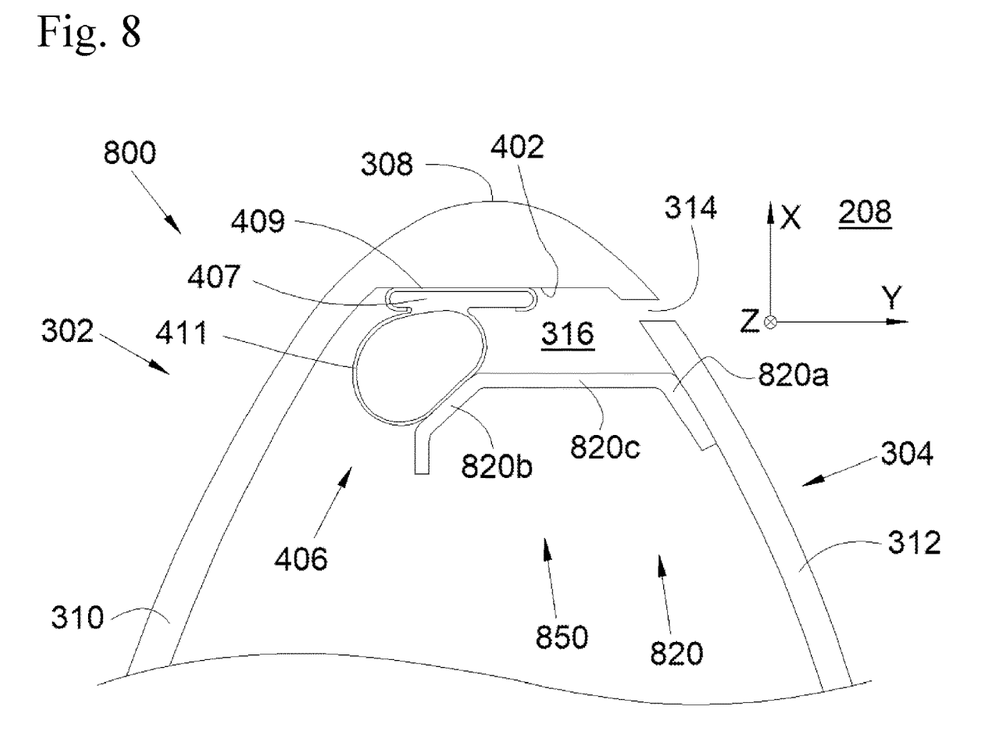
FIG. 8 shows a view similar to the view of FIG. 3 for a securing system according to a third embodiment of the invention.
Figure 9:
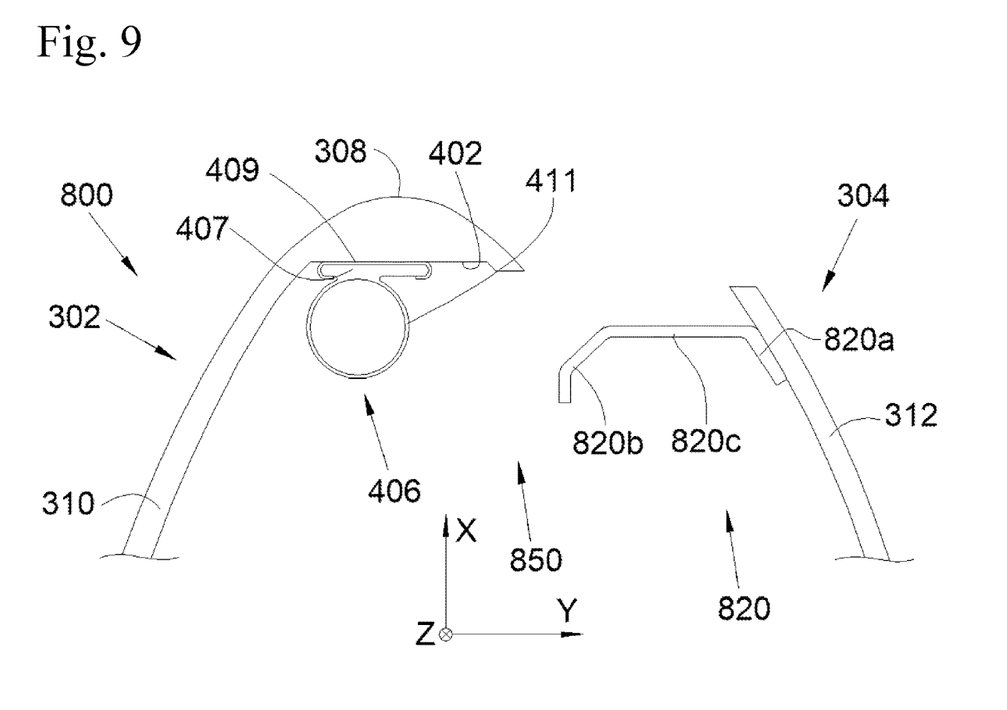
FIG. 9 shows the securing system of FIG. 8 in the open position.

FIG. 1 and FIG. 2 are identical in the case of the invention and in the case of the prior art, the only differences between the subject matter of the invention and the prior art lying in the structure of the connection system and these differences are only visible in the views in section shown in FIGS. 4 and 5 for a first embodiment of the invention, FIGS. 6 and 7 for a second embodiment of the invention and FIGS. 8 and 9 for a third embodiment of the invention. Therefore, the elements common to the invention and to the prior art bear the same reference signs.

The aircraft 100 comprises a turbojet engine 150 having two thrust reverser modules 152 which are equipped with means, such as reverser doors, for diverting the secondary stream outwards and towards the front of the turbojet engine 150 so as to slow down the aircraft 100. There is one thrust reverser module 152 to port and one to starboard, pivotably mounted on a structure of the turbojet engine 150 between a close-together position for flight and a spaced-apart position for maintenance. The movement of each thrust reverser module 152 is a rotation about a horizontal axis 52.

In the description below, terms relating to a position refer to an aircraft in the normal flight position, i.e., as shown in FIG. 1, and the "front" and "rear" positions are relative to the front and the rear of the turbojet engine and relative to the direction of forward travel of the aircraft 100 when the turbojet engine 150 is in operation.

In the description below, and by convention, X means the longitudinal direction of the reverser modules which is coincident with the longitudinal direction X of the turbojet engine and oriented towards the front of the aircraft, Y means the transverse direction which is horizontal when the aircraft is on the ground, and Z means the vertical direction which is vertical when the aircraft is on the ground, these three directions X, Y and Z being at right angles to one another.

Each reverser module 152 comprises an inner casing 202 and an outer casing 204. The two casings 202 and 204 each generally have the shape of a half-cylinder centered on the longitudinal direction X of the reverser module 152. The inner casing 202 is housed inside the outer casing 204 and each casing 202, 204 is secured to a structure of the reverser module 152. The structure of the reverser module 152 may be a part of either of the casings 202, 204.

The inner casings 202 delimit an internal volume 206 in which is housed the core of the turbojet engine 150. The secondary duct 208 is delimited between each inner casing 202 and the corresponding outer casing 204.

At the lower fork, the reverser module 152 comprises a securing system 400, 600, 800 which is shown in section in FIGS. 4 to 9 and which secures, for each reverser module 152, the two casings 202 and 204 to one another concentrically, i.e., secures the inner casing 202 to the outer casing 204 of the reverser module 152 in question.

FIG. 4 shows the securing system 400 in the close-together position of operation and FIG. 5 shows the securing system 400 in the spaced-apart position open for maintenance.

FIG. 6 shows the securing system 600 in the close-together position of operation and FIG. 7 shows the securing system 600 in the spaced-apart position open for maintenance.

FIG. 8 shows the securing system 800 in the close-together position of operation and FIG. 9 shows the securing system 800 in the spaced-apart position open for maintenance.

During maintenance of the turbojet engine 150, the two reverser modules 152 are moved apart by a technician and the securing system 400, 600, 800 is opened (FIG. 5, FIG. 7, FIG. 9), to check the components that are housed in the securing system 400, 600, 800. To this end, the securing system 400, 600, 800 comprises a first hood 302, in this case the port-side hood in the figures, secured between the inner casing 202 and the outer casing 204 of one of the reverser modules 152, in this case to port, and a second hood 304, in this case the starboard-side hood, secured between the inner casing 202 and the outer casing 204 of the other reverser module 152, in this case to starboard.

The close-together position corresponds to the position of operation (FIG. 4, FIG. 6, FIG. 8) in which the first hood 302 and the second hood 304 are to closest to one another, and the spaced-apart position corresponds to the position of maintenance (FIG. 5, FIG. 7, FIG. 9) in which the first hood 302 and the second hood 304 are furthest from one another. In the position of operation, the second hood 304 is held in position on the structure by securing means such as screw elements.

As in the prior art, the first hood 302 has a leading edge 308 which faces the secondary stream which flows parallel to the longitudinal direction X in the secondary duct 208. The leading edge 308 is in this case generally parallel to the vertical direction Z.

The second hood 304 comprises a second flank 312, in this case to starboard, which extends to the rear and on one of the sides of the leading edge 308 and the first hood 302 has a first flank 310, in this case to port, rigidly secured to the leading edge 308 and extending to the rear and on the other of the sides of the leading edge 308. The first flank 310 extends the leading edge 308.

When the first hood 302 and the second hood 304 are in the position of operation, the second flank 312 extends the leading edge 308 and a channel 314 is present between the first hood 302 and the second flank 312.

In the close-together position, the first hood 302 and the second hood 304 delimit between them a housing 316.

The first hood 302 has, to the rear of the leading edge 308, a securing wall 402 which extends perpendicularly to the longitudinal direction X, i.e., parallel to the plane YZ, and which partially delimits the housing 316 formed inside the securing system 400, 600, 800 between the first hood 302 and the second hood 304 and in fluid communication with the channel 314.

The securing system 400, 600, 800 comprises a seal 406, such as an elastomer seal, which is secured to the securing wall 402 in the housing 316 between the first flank 310 and the second flank 312. The seal 406 creates a fluid tight and fireproof seal between the interior of the securing system 400, 600, 800 and the secondary duct 208.

To this end, the seal 406 comprises a foot 407 and a sausage 411 rigidly secured to the foot 407. The seal 406 is secured in the housing 316 to the securing wall 402 via the foot 407 and, to this end, the securing system 400, 600, 800 comprises a shoe 409 which is secured to the securing wall 402 and in which the foot 407 is held.

The foot 407 is thus secured in the vertical plane YZ perpendicular to the longitudinal direction X and the sausage 411 protrudes towards the rear in the housing 316 from the foot 407 in the longitudinal direction X.

In each of the embodiments, the securing system 400, 600, 800 comprises a crushing means 450, 650, 850 rigidly secured to the second hood 304 and arranged so as to crush the sausage 411 towards the securing wall 402 when the second hood 304 goes from the spaced-apart position to the close-together position.

In the first and second embodiments presented in FIGS. 4 to 7, the securing system 400, 600 further comprises a first elastic strip 418, in particular, a metal leaf spring, a first end 418a of which is secured in the housing 316 inside the first wall 310 of the first hood 302 and a second end of which 418b is free and protrudes towards the second wall 312 of the second hood 304. Between the first end 418a and the second end 418b, the first strip 418 has a flat area 418c which is generally parallel to the securing wall 402.

Thus, in the longitudinal direction X, the seal 406 is positioned between the securing wall 402 and the flat area 418c and the sausage 411 bears against the flat area 418c of the first strip 418.

The crushing means 450, 650 of the securing system 400, 600 comprises a pushing means 420, 620 which is rigidly secured to the second hood 304 and which is arranged so as to move the flat area 418c towards the securing wall 402 when the second hood 304 goes from the spaced-apart position to the close-together position, i.e. when the second hood 304 moves generally parallel to the transverse direction Y owing to the dimensions of the turbojet engine 150. The action of the pushing means 420, 620 on the first strip 418 tends to elastically deform the first strip 418, in particular, at the join between the first end 418a and the flat area 418c.

Thus, the flat area 418c moves mainly parallel to the longitudinal direction X, and the sausage 411 is also compressed in the longitudinal direction X. Even if, during its movement, the second hood 304 has spurious movements parallel to the longitudinal direction X, the movements are added to the movements caused by the pushing means 420, 620 which are in the same direction and there is therefore no cutting force perpendicular to the longitudinal direction X in the area where the sausage 411 joins the foot 407 and the seal 406 is thus preserved.

Moreover, the seal 406 may be smaller since it is only stressed in the longitudinal direction, independently of the transverse direction Y in which the manufacturing and assembly are tolerances, and the movements in flight, are applied, which facilitates the transition to the close-together position.

In the spaced-apart position, the first strip 418 is in a rest position and is subjected to the pressure exerted by the sausage 411

In the close-together position, the first strip 418 is in an active position in which it is closer to the securing wall 402 than in the rest position and compresses the sausage 411.

In the embodiment of the invention in FIG. 4 and in FIG. 5, the pushing means 420 takes the form of a second elastic or rigid strip 420, in particular, a metal strip for example, a first end of which 420a is secured in the housing 316 inside the second wall 312 of the second hood 304 and a second end 420b of which is free and protrudes towards the first wall 310 of the first hood 302. Between the first end 420a and the second end 420b, the second strip 420 has a flat area 420c which is generally parallel to the securing wall 402.

When the second strip 420 is elastic and in the spaced-apart position, it is in a rest position and the flat area 420c of the second strip 420 is positioned level with or in front of the flat area 418c of the first strip 418. In the close-together position, the second strip 420 is in an active position in which it is further away from the securing wall 402 than in the rest position and the flat area 420c of the second strip 420 is positioned behind and against the flat area 418c of the first strip 418 relative to the sausage 411. Thus, when the second hood 304 moves towards the first hood 302, the flat area 420c of the second strip 420 moves behind in contact with the flat area 418c of the first strip 418 and the second strip 420 retracts into its active position while pushing the first strip 418 towards the front, the latter moving into its active position.

When the second strip 420 is rigid, it stays in the same position, wherein in the spaced-apart position, the flat area 420c of the second strip 420 is level with or in front of the flat area 418c of the first strip 418, and wherein in the close-together position, the flat area 420c of the second strip 420 is positioned behind and against the flat area 418c of the first strip 418 relative to the sausage 411 and pushes the first strip 418 towards the front, the latter moving into its active position.

To facilitate the passage of the second strip 420 behind the first strip 418 when going from the spaced-apart position to the close-together position, the second end 418b of the first strip 418 is curved towards the securing wall 402 and the second end 420b of the second strip 420 is curved away from the securing wall 402. Thus, when moving from the spaced-apart position to the close-together position, the two curved ends 418b and 420b slide one on top of the other so as to move the strips 418 and 420 from their rest positions into their active positions.

In the embodiment of the invention of FIGS. 6 and 7, the pushing means 620 also takes the form of a second elastic or rigid strip 620, in particular a metal strip for example, a first end 620a of which is secured in the housing 316 inside the second wall 312 of the second hood 304 and a second end 620b of which is free and protrudes towards the first wall 310 of the first hood 302 and towards the rear of the reverser module 152. Between the first end 620a and the second end 620b, the second strip 420 has a flat area 620c which has an acute angle relative to the securing wall 402. According to one particular embodiment, the angle is for example greater than 0° and less than 70°.

When the second strip 620 is elastic and in the spaced-apart position, it is in a rest position and in the close-together position, the second strip 620 is in an active position with an angle relative to the securing wall 402 which is smaller than in the rest position. The flat area 620c of the second strip 620 is positioned so as to come into contact with the second end 418b of the first strip 418 when going from the spaced-apart position to the close-together position. Thus, when the second hood 304 moves closer to the first hood 302, the flat area 620c of the second strip 620 comes into contact with the second end 418b of the first strip 418 and owing to the acute angle, the flat area 620c pushes the first strip 418 towards the front, the latter moving into its active position.

When the second strip 420 is rigid, it stays in the same position, and the flat area 620c of the second strip 620 is positioned so as to come into contact with the second end 418b of the first strip 418 when going from the spaced-apart position to the close-together position.

To facilitate the sliding of the second end 418b of the first strip 418 on the flat area 620c of the second strip 620, the second end 418b of the first strip 418 is curved towards the securing wall 402.

The strips 418, 420, 620 also make it possible to create labyrinths which reinforce the sealing action of the seal 406.

In the third embodiment of the invention presented in FIGS. 8 and 9, the crushing means 850 of the securing system 800 takes the form of an elastic or rigid strip 820, in particular a metal strip for example, a first end 820a of which is secured in the housing 316 inside the second wall 312 of the second hood 304 and a second end 820b of which is free and protrudes towards the first wall 310 of the first hood 302.

In the embodiment of the invention presented in this case, between the first end 820a and the second end 820b, the strip 820 has a flat area 820c which is generally parallel to the securing wall 402 and the second end 820b is curved away from the securing wall 402.

In the spaced-apart position, the second end 820b is positioned facing the sausage 411 parallel to the transverse direction Y, and preferably between the middle and the rear of the sausage 411.

In the close-together position, the second end 820b comes into contact with the sausage 411 and it compresses the sausage 411 in a plane dependent on the components X and Y. The behavior and integrity of the sausage 411 are ensured by the fact that it rolls during compression by the second end 820b. In the close-together position, the strip 820 thus bears against the sausage 411 and creates a fluid tight and fireproof seal.

As in the other embodiments, the size of the seal 406 is smaller because the bolt adjustment tolerances do not have to be taken into account entirely since the X component reduces the Y component and less force is required to close the hoods.

In the embodiment of the invention presented in FIGS. 8 and 9, the plane of symmetry of the sausage 411, which is parallel to the plane XZ, is offset towards the first hood 302 parallel to the transverse direction Y, relative to the plane of symmetry of the foot 407 parallel to the plane XZ.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A turbojet engine of an aircraft having a longitudinal direction and a transverse direction perpendicular to the longitudinal direction and comprising:
   a structure,
   two thrust reverser modules pivotably mounted on the structure between a close-together position and a spaced-apart position,
   wherein each thrust reverser module comprises an outer casing formed generally as a half-cylinder centered on the longitudinal direction, an inner casing formed generally as a half-cylinder centered on the longitudinal direction, housed inside the outer casing, and
   a securing system for securing, for each thrust reverser module, the inner casing to the outer casing, and comprising:
      a first hood secured between the inner casing and the outer casing of one of the reverser modules, and having a leading edge,
      a second hood secured between the inner casing and the outer casing of the other of the reverser modules,
      wherein a housing is formed between the first hood and the second hood and delimited by a securing wall of the first hood extending perpendicularly to the longitudinal direction at the rear of the leading edge,
      a seal comprising a foot and a sausage rigidly secured to the foot, wherein the foot is secured in the housing to the securing wall and wherein the sausage protrudes from the foot in the longitudinal direction, and
      a crushing means rigidly secured to the second hood and arranged to crush the sausage towards the securing wall when the second hood goes from the spaced-apart position to the close-together position.

2. The turbojet engine according to claim 1, wherein the securing system further comprises a first elastic strip with a first end secured in the housing to the first hood, a second end which is free and protrudes towards the second hood, and, between the first end and the second end, a flat area generally parallel to the securing wall,
wherein the sausage bears against the flat area, and
wherein the crushing means is a pushing means rigidly secured to the second hood and arranged so as to move the flat area towards the securing wall when the second hood goes from the spaced-apart position to the close-together position.

3. The turbojet engine according to claim 2, wherein the pushing means is a second strip with a first end secured in the housing to the second hood, a second free end protruding towards the first hood and, between the first end and the second end, a flat area generally parallel to the securing wall,
wherein, in the spaced-apart position, the first strip is in a rest position,
wherein the flat area of the second strip is level with or in front of the flat area of the first strip,
wherein, in the close-together position, the first strip is in an active position in which it is closer to the securing wall than in the rest position, and the flat area of the second strip is positioned behind and against the flat area of the first strip relative to the sausage.

4. The turbojet engine according to claim 3, wherein the second end of the first strip is curved towards the securing wall and the second end of the second strip is curved away from the securing wall.

5. The turbojet engine according to claim 2, wherein the pushing means is a second strip with a first end secured in the housing to the second hood, a second free end protruding towards the first hood and towards a rear of the reverser modules, and, between the first end and the second end, a flat area which has an acute angle relative to the securing wall, wherein, in the spaced-apart position, the first strip is in a rest position, wherein, in the close-together position, the first strip is in an active position in which it is closer to the securing wall than in the rest position, and wherein the flat area of the second strip is positioned so as to come into contact with the second end of the first strip when going from the spaced-apart position to the close-together position.

6. The turbojet engine according to claim 5, wherein the second end of the first strip is curved towards the securing wall.

7. The turbojet engine according to claim 1,
wherein the crushing means is a strip, a first end of which is secured in the housing inside a second wall of the second hood and a second end of which is free and protrudes towards a first wall of the first hood,
wherein the second end is curved away from the securing wall, and
wherein, in the spaced-apart position, the second end is positioned facing the sausage.

8. The turbojet engine according to claim 7, wherein a plane of symmetry of the sausage is offset towards the first hood relative to a plane of symmetry of the foot.

9. An aircraft comprising a turbojet engine according to claim 1.

* * * * *